Dec. 19, 1967   JAMES E. WEBB   3,359,435
ADMINISTRATOR OF THE NATIONAL AERONAUTICS
AND SPACE ADMINISTRATION
HOLDER FOR CRYSTAL RESONATORS
Filed May 4, 1965

INVENTOR
KENNETH H. LEVAY
BY
ATTORNEYS

United States Patent Office 3,359,435
Patented Dec. 19, 1967

3,359,435
HOLDER FOR CRYSTAL RESONATORS
James E. Webb, Administrator of the National Aeronautics and Space Administration, with respect to an invention of Kenneth H. Le Vay, Panorama City, Calif.
Filed May 4, 1965, Ser. No. 453,232
3 Claims. (Cl. 310—9.1)

ABSTRACT OF THE DISCLOSURE

A holder for a high frequency crystal defining a main support cavity, in which the crystal is supported under pressure. A pair of vibration cavities extend from the support cavity on opposite sides thereof to provide free space into which the crystal can vibrate. Conductive layers on opposite sides of the support cavity and leads connected thereto provide means by which the crystal may be connected to external circuits.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to crystal holders and, more particularly, to improvements thereof.

Various packaging techniques are presently used to mount or encase components of electrical circuits which may be subject to extremely high acceleration or impact. Generally, the components are sealed in a housing filled with epoxy which hardens, and thereby completely encases them by filling the space therebetween. Such techniques are inadequate for mounting a high frequency crystal which may be subjected to high impact. Such a crystal must be free to vibrate or oscillate; therefore, the space thereabout cannot be completely filled. But, despite such freedom of oscillation, in order to prevent the crystal from being damaged by high impact, it must be rigidly supported or mounted. Prior art techniques of mounting crystal in slots or by spring biasing the crystal between rigid layers have been found to be unsatisfactory when the crystal is subject to very high acceleration levels or impacts.

Accordingly, it is an object of the present invention to provide a new device for mounting the high frequency crystal.

Another object of the present invention is the provision of a new housing within which the high frequency crystal can be rigidly supported to withstand high impact or acceleration, yet be free to vibrate or resonate therein.

A further object of the present invention is the provision of a novel, small, relatively inexpensive housing for encasing a high frequency crystal, designed to withstand very high acceleration levels or impacts.

Still a further object of the invention is the provision of a novel multicavity housing for encasing a high frequency crystal which is able to withstand extremely high acceleration levels or impacts.

These and other objects of the present invention are achieved by providing a multicavity two-part housing in which a crystal is pressure mounted between two flat surfaces or faces of the two parts. One of the housing parts has a support cavity in which the crystal is placed. The depth of the support cavity is slightly less than the thickness of the crystal, so that when the two parts of the housing are connected together under pressure, the crystal is pressure mounted between the flat surface of the two-part housing. Each of the parts has a shallow vibration cavity, providing an unimpeding space in which the crystal may vibrate.

The two flat surfaces of the two-part housing which support the crystal under pressure are coated with a conductive material, thereby providing electrical contacts for the crystal. Leads are connected to the conductive material through the housing so as to provide means for conductively coupling the crystal to externally mounted components. By pressure mounting the crystal between the two parts of the housing, the crystal is highly resistant to impacts, yet is able to freely vibrate in the vibration cavities of either side thereof. In addition, by coating with conductive material the surfaces against which the crystal is pressed, the overall impedance of the crystal and the conductive surfaces coupled thereto is minimized in comparison with best known prior art crystal assemblies.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
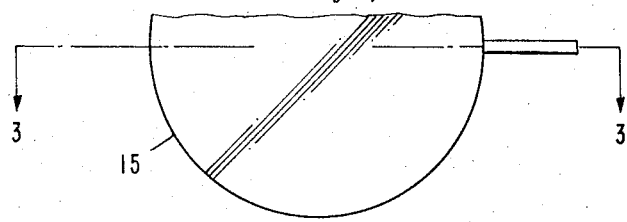
FIGURE 1 is a top elevational view of a crystal housing of the present invention.
Figure 2:
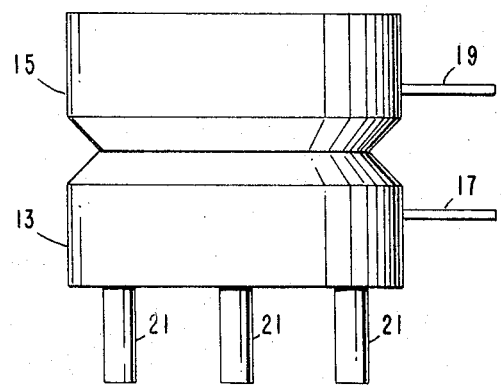
FIGURE 2 is a side elevational view of the crystal housing shown in FIGURE 1.

Reference is now made to FIGURES 1 and 2 which are respectively top and side elevational views of a housing 11 for supporting a high frequency crystal. The crystal is mounted within mating housing members 13 and 15, constructed of nonconductive material. A pair of conducting leads 17 and 19, extending through members 13 and 15, respectively, are conductively coupled to conductive surfaces within the housing 11, thereby providing means for coupling the supported crystal to the circuit in which it is incorporated. The bottom housing member 13 also includes a plurality of mounting studs 21 for rigidly clamping the housing 11 to an appropriate structure (not shown).

Figure 3:
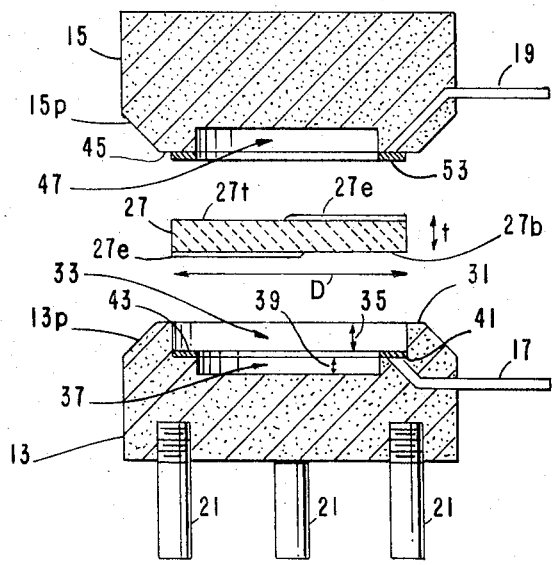
FIGURE 3 is an expanded cross-sectional view across lines 3—3 of FIGURE 1.

Reference is now made to FIGURE 3 which is an expanded cross-sectional view along lines 3—3 of FIGURE 1. As seen, a disc-shaped high frequency crystal 27 of a diameter designated by arrow D and a thickness designated by arrow $t$, has a pair of electrodes 27e, plated on its opposite faces 27b and 27t. The thickness of the electrodes is very small so that the overall thickness of the crystal with the electrodes may be assumed to be equal to $t$. The bottom member 13 has a flat top surface 31 through which a support cavity 33 extends downwardly to a depth 35, with a second cavity 37 further extending downwardly therefrom to a depth 39. The diameter of cavity 33 is at least equal to diameter D of crystal 27, whereas the diameter of cavity 37 is less than the diameter D of the crystal so that the crystal 27 may be supported on an internal ring-shaped ridge 41 of member 13. The ridge 41 is coated with a thin layer 43 of conductive material on which the crystal may be supported so that electrode 27e on face 27b is in contact therewith. The conductive lead 17 extends through member 13 and ridge 41 to be in conductive contact with the layer 43, thus providing a first conductive lead or contact for the crystal 27.

The top housing member 15 is similar to member 13, except for the cavity 33. Member 15 has a flat bottom surface 45 through which a cavity 47 extends upwardly, the depth and diameter thereof being equal to the depth and diameter of cavity 37. A ring-shaped thin layer 53 of conductive material is deposited on the surface 45 about the periphery of the cavity 47, with lead 19 extending through member 15 being in contact with the conductive layer 53. Thus, when the crystal 27 is placed in cavity 33 and member 15 placed on top of it, faces 27b and 27t of crystal 27 by means of electrodes 27e and conductive surfaces 43 and 53, are conductively coupled to leads 17 and 19, respectively.

The depth of cavity 33 is especially designed to be less than thickness t of crystal 27. Thus, the designed amount of pressure must be applied to the members 13 and 15 before flat surfaces 31 and 45 are in mating contact with one another, at which time cone-shaped periphery edges 13p and 15p of the members which are metalized are soldered or welded together so that members 13 and 15 form an integral housing unit. The pressure required to bring faces 31 and 45 into mating contact is applied to the internally supported crystal 27, which remains pressure mounted between the thin layers 43 and 53 of the conductive material. The required amount of presure is dictated by the characteristic of the crystal 27 and, in particular, the acceleration which the crystal is expected to withstand. Thus, crystal 27 is provided with sufficient impact resistance to be able to withstand the maximum anticipated accelerations.

The depth 39 of cavities 37 and 47 is designed to be sufficiently deep to allow the active portions of surfaces 27b and 29b of crystal 27 which are not pressed between layers 43 and 53 unrestricted movement during vibration or oscillation. Namely, cavities 37 and 47 provide free space in which the crystal can vibrate. The ridge structure 41 (of member 13), as well as the thickness and width of layers 43 and 53, are made only big enough to properly support crystal 27 under the required pressure. Thus, the overall impedance of the conductive layers is held to a minimum so that the overall impedance of the crystal assembly is quite low. In addition, only a narrow peripheral section of the crystal is used for supporting the crystal, with most of its two surfaces being free to vibrate.

From the foregoing description, it should be appreciated that the novel structure of the two-part housing of the present invention is designed to provide a high frequency crystal supported therein with optimum mechanical and electrical charcteristics. By pressure mounting the crystal between two thin deposited layers of conductive material, the crystal is provided with sufficient resistance to impacts so as to be able to withstand extreme accelerations. Also, by holding the dimensions of the layers of the conductive material to a permissible minimum, the overall impedance of the crystal assembly can be controlled to be substantially less than the minimum impedance characteristics of presently known crystal holders. Furthermore, the narrow layers of conductive material which supoprt the crystal only limit its vibratory activity to a narrow peripheral section thereof so that most of the crystal surface is free to vibrate, thus providing the crystal with high activity characteristics.

Although, in the foregoing description, the invention has been described in conjunction with a circular disc-shaped crystal, reference having been made to the diameters of the various cavities, the invention is not limited thereto. Rather, the cross-sections of the cavities, and in particular, the cross-section of the support cavity 33, is dependent on the cross-sectional shape of the crystal to be housed. Also, the depth 35 of cavity 33 is related to the thickness of the crystal. Similarly, the cross-sections of cavities 37 and 47 are dependent on the cross-section of cavity 33 so as to minimize the support ridge 41, as well as the width of the layers 43 and 45 on which the crystal is supported. The depth of cavities 37 and 47 is dictated by the vibratory characteristics of the particular crystal to insure sufficient free space in which the crystal may vibrate.

In one actual reduction to practice, housing members 13 and 15 were constructed from a nonconductive ceramic material known as alumina, with leads 17 and 19 made of platinum, .040 inch in diameter, fired into the ceramic. The depth of each of cavities 37 and 47 was approximately equal to .002 inch, whereas the depth of support cavity 35 was made equal to the thickness of the crystal to be mounted therein less .0003 inch. Thus, a pressure of approximately eight pounds was necessary to press housing members 13 and 15 against one another, so as to pressure mount the crystal between the layers 43 and 53 which were vacuum deposited gold. The cone-shaped periphery surfaces 13p and 15p of the housing members 13 and 15 respectively were metalized surfaces which were soldered together after the crystal had been properly supported therebetween. Mechanical and electrical tests performed on the crystal housed in the housing of the present invention proved the ability of the crystal to withstand accelerations which equaled 12,000 g's. Also, the impedance of the crystal assembly was approximately 30% less than the impedance of other known crystal assemblies.

There has accordingly been described and shown herein a novel and useful crystal housing, for supporting a high frequency crystal which is expected to experience extremely high changes in acceleration. It should be appreciated that those familiar with the art may modify the arrangements as shown without departing from the spirit of the invention. For example, instead of conductively coupling the crystal 27 to the leads 17 and 19, the crystal can be capacitively coupled. This may be accomplished by eliminating electrodes 27e, conductive layers 43 and 53 and coating the top of cavity 47 and bottom of cavity 37, with leads 19 and 17 respectively coupled thereto. Similarly, other modifications which may be made are deemed to fall within the scope of the invention as claimed.

What is claimed is:

1. A resonator device comprising a disc-shaped crystal, a housing of a nonconductive material defining a disc-shaped central cavity and a pair of disc-shaped vibration cavities, each vibration cavity being disposed on a different side of said central cavity, the centers of the cavities being substantially aligned on a straight line, the cross-sectional area of each vibration cavity being smaller than the cross-sectional area of said crystal; conductive layers of material deposited on the opposite surfaces of said central cavity adjacent said vibration cavities, the spacing between said layers being less than the thickness of said disc-shaped crystal, and the cross-sectional area of said central cavity being at least equal to the cross-sectional area of said crystal for supporting said crystal under pressure between the conductive layers thereof; and conductive leads extending through said housing coupled to said layers of material to be conductively coupled with said crystal.

2. In combination with a high frequency disc-shaped crystal a ceramic housing for supporting said high frequency disc-shaped crystal to possess characteristics so as to withstand large accelerations without affecting the operability thereof, said housing having two internally parallelly disposed surfaces coated with thin layers of conductive material, said layers defining opposite ends of a disc-shaped support cavity, the cross-sectional area thereof being at least as great as the cross-sectional area of said disc-shaped crystal, and the depth of said support cavity being substantially 0.0003 inch less than the thickness of said crystal when not supported under pressure between said layers of conductive material, said housing further defining a pair of vibration cavities each having a cross-section smaller than the cross-section of said crystal so that said crystal is supported at a peripheral band thereof not exceeding 0.062 inch in width, the depth of each cavity being substantially equal to 0.002 inch for providing free spaces for the surfaces of said disc-shaped crystal not supported under pressure by said layer of conductive material to freely vibrate therein; and a pair of conductive leads extending through said ceramic housing and conductively coupled to said deposited layer of conductive material to provide coupling means to the crystal pressure supported therebetween.

3. In combination, a resonator comprising a housing, a high frequency crystal, said housing including a first housing member having a flat surface and defining a support cavity extending from said flat surface to a depth less than the thickness of said high frequency crystal, said support cavity having a cross-section sufficient for the crystal to be placed therein, said first housing member further defining a first vibration cavity extending from said support cavity, said vibration cavity being of predetermined depth sufficient for said high frequency crystal to freely vibrate therein, said vibration cavity having a cross-section smaller than the cross-section of said support cavity to form a support surface in the support cavity for supporting said crystal thereon; a first layer of conductive material deposited on the bottom of said vibration cavity; a second housing member having a flat surface and defining a second vibration cavity extending therefrom the depth and cross-section thereof being equal to the depth and cross-section of said first vibration cavity; a second layer of conductive material deposited on the top of said second vibration cavity; means for connecting said first and second housing members with said high frequency crystal in said support cavity being pressure mounted within said support cavity; and a pair of conductive leads in contact with said first and second layers of conductive material for capacitively coupling said crystal thereto.

References Cited
UNITED STATES PATENTS

| | | | |
|---|---|---|---|
| 2,457,338 | 12/1948 | Bates | 310—9.4 |
| 2,802,955 | 8/1957 | Kitterman | 310—9.4 |
| 2,824,219 | 2/1958 | Fisher | 310—8.9 |
| 2,877,362 | 3/1959 | Tibbetts | 310—9.4 |
| 2,912,605 | 11/1959 | Tibbetts | 310—9.4 |
| 3,137,836 | 6/1964 | Glover | 310—9.4 |
| 3,215,977 | 11/1965 | Williams | 310—8.7 |
| 3,222,462 | 12/1965 | Karmann | 310—9.1 |

MILTON O. HIRSHFIELD, *Primary Examiner.*

J. D. MILLER, *Examiner.*